United States Patent
Chang et al.

(10) Patent No.: US 11,295,251 B2
(45) Date of Patent: Apr. 5, 2022

(54) INTELLIGENT OPPORTUNITY RECOMMENDATION

(71) Applicant: INTERNATIONAL BUSINESS MACHINES CORPORATION, Armonk, NY (US)

(72) Inventors: Alice J. Chang, New York, NY (US); Benjamin Dubiel, Windermere, FL (US); Xiaoxi Tian, Brooklyn, NY (US); Elizabeth Daly, Dublin (IE); Inge L. Vejsbjerg, Kilmainham (IE); Massimiliano Mattetti, Dublin (IE); Bei Chen, Blanchardstown (IE); Oznur Alkan, Clonsilla (IE); Adi I. Botea, Dublin (IE); Sanjmeet Abrol, White Plains, NY (US); Weiwei Li, White Plains, NY (US); Alan Zwiren, Lake Worth, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 150 days.

(21) Appl. No.: 16/188,516

(22) Filed: Nov. 13, 2018

(65) Prior Publication Data
US 2020/0151651 A1    May 14, 2020

(51) Int. Cl.
*G06Q 10/06* (2012.01)
(52) U.S. Cl.
CPC ............... *G06Q 10/063118* (2013.01); *G06Q 10/063112* (2013.01)

(58) Field of Classification Search
None
See application file for complete search history.

(56) References Cited

U.S. PATENT DOCUMENTS

| | | | |
|---|---|---|---|
| 7,881,957 B1 * | 2/2011 | Cohen | G06Q 10/06 |
| 8,352,301 B1 * | 1/2013 | Starr | G06Q 10/00 705/7.12 |
| 2014/0358606 A1 | 12/2014 | Hull | |
| 2015/0112756 A1 | 4/2015 | Subramanian et al. | |
| 2016/0371625 A1 * | 12/2016 | Mosley | G06Q 10/06398 |
| 2017/0111507 A1 * | 4/2017 | McGann | G06Q 10/063112 |
| 2018/0268373 A1 | 9/2018 | Bheemavarapu et al. | |

FOREIGN PATENT DOCUMENTS

TW    201842455 A  *  12/2018  ........... G06F 9/5005

OTHER PUBLICATIONS

Ali Khalili, A Framework for Distributed Market Place based on Intelligent Software Agents and Semantic Web Services, 2008, IEEE Congress on Services Part II (Year: 2008).*

* cited by examiner

*Primary Examiner* — Jerry O'Connor
*Assistant Examiner* — Matthew H Divelbiss
(74) *Attorney, Agent, or Firm* — Griffiths & Seaton PLLC

(57) ABSTRACT

Embodiments for implementing intelligent opportunity recommendation and management by a processor. A channel selection model mat be applied to a selected opportunity in view of a plurality of opportunity attributes to identify one or more team candidates of an entity or one or more entity partners ranked by alignment with the selected opportunity and determine a recommended opportunity owner from the one or more team candidates of the entity, the one or more entity partners, or a combination thereof.

17 Claims, 9 Drawing Sheets

INTELLIGENT OPPORTUNITY RECOMMENDATION

BACKGROUND OF THE INVENTION

Field of the Invention

The present invention relates in general to computing systems, and more particularly to, various embodiments for implementing intelligent opportunity recommendation and management by a processor.

Description of the Related Art

In today's interconnected and complex society, computers and computer-driven equipment are more commonplace. Processing devices, with the advent and further miniaturization of integrated circuits, have made it possible to be integrated into a wide variety of devices. Due to the recent advancement of information technology and the growing popularity of the Internet, a vast amount of information is now available in digital form. Such availability of information or data has provided many opportunities. As the technology field grows exponentially each year and ever-growing amounts of data are stored, retrieved, and accessed on computing systems, the need to deliver accurate and applicable data becomes increasingly paramount. Consequently, the need for advancement in a computing system capable of recommending relevant and accurate information is of great precedence.

SUMMARY OF THE INVENTION

Various embodiments for implementing intelligent opportunity recommendation and management by a processor, are provided. In one embodiment, by way of example only, a method for implementing intelligent opportunity recommendation and management, by a processor, is provided. A channel selection model may be applied to a selected opportunity in view of a plurality of opportunity attributes to identify one or more team candidates of an entity or one or more entity partners ranked by alignment with the selected opportunity and determine a recommended opportunity owner from the one or more team candidates of the entity, the one or more entity partners, or a combination thereof.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
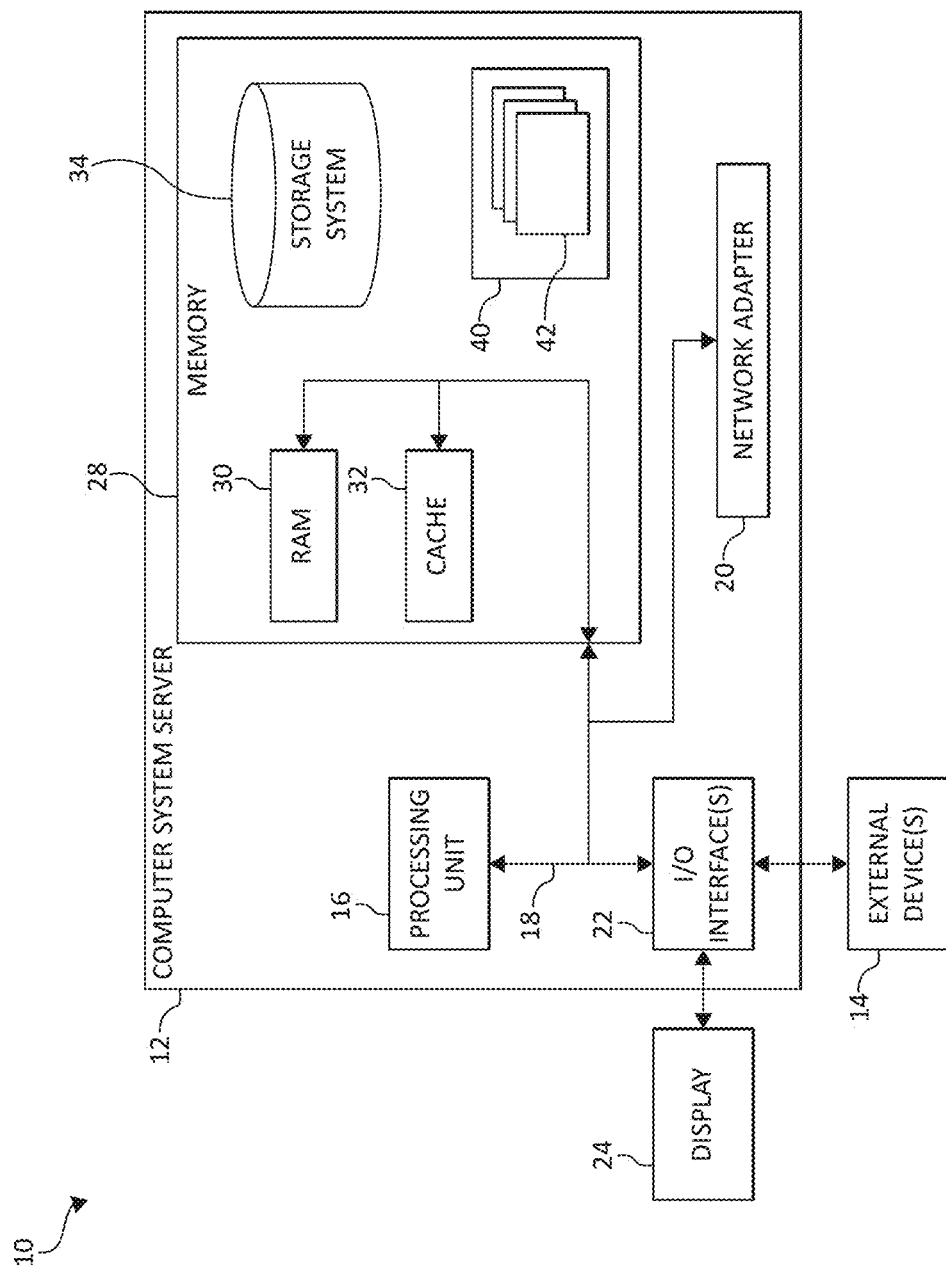
FIG. 1 is a block diagram depicting an exemplary computing node according to an embodiment of the present invention.

The advancement of computing storage and computational power provide the ability to collect large amounts of data, particularly for various types of data relating to businesses, organizations, or governments. Moreover, as the amount of electronic information continues to increase, the demand for sophisticated information access systems also grows. Digital or "online" data has become increasingly accessible through real-time, global computer networks. Many data-intensive applications require the extraction of information from data sources, such as, for example, within a business environment.

More specifically, improving productivity, effectiveness, and opportunities of a business, organization, or government entity can be an effective operational strategy to drive revenue growth and manage bottom-line expenses. In one aspect, an entity or "enterprise entity" includes, but is not limited to: a private organization (e.g., bank, private company, etc.), a public organization (e.g., public school, government, police/fire department, post office, etc.), non-profit organization, a person, a product, etc. In an additional aspect, an entity may be a client of another entity (e.g., a person is a client of a business or a certain business is a client of another type of business, etc.). Sales productivity, effectiveness, and opportunity are among critical issues for most companies, especially those with a sales force and client-oriented organizations (e.g., consulting companies, insurance companies, software and hardware manufacturers, etc.).

Entities generally find it difficult to discover and acquire new clients and opportunities (e.g., sales opportunity/projects). Currently, decisions at various stages of a sales pipeline are manually made by individual sellers or by managers who make centralized decisions. This suffers from many drawbacks such as, for example, delayed decision times resulting in lost or stale opportunities. Additionally, sellers with little experience or with a lack of personal knowledge may be inclined to make inefficient or sub-optimal decisions.

Thus, success and efficiency for securing (e.g., "winning") an opportunity often depends on a team or personnel formed and the team dynamics involved. Team dynamics include factors such as skills, experience, location and proximity, client relationships, history of working together, and social relationships. Finding the appropriate or right people/entities (e.g., persons or business partners) to harmoniously work together may be a challenge given high turnover and skill sets may evolve quickly as the team's goals rapidly change. For example, a sales force may experience high turnover, which can further reduce opportunity acquisition as it may take anywhere from months to even years for a seller to be effective at an assigned sales role partly due to the time it takes to build a network of contacts and acquire domain knowledge.

Therefore, the various aspects of the present invention, among other things, provide a cognitive system for intelligent opportunity recommendation and management. The cognitive system may provide a pipeline management tool to automatically optimize decisions based on incoming opportunities and assist the decision-making process for opportunity management. A channel selection model may be applied to a selected opportunity in view of a plurality of opportunity attributes to identify one or more team candidates of an entity or one or more entity partners ranked by alignment with the selected opportunity and determine a recommended opportunity owner from the one or more team candidates of the entity, the one or more entity partners, or a combination thereof. The cognitive system may recommend team composition based on analyzing project needs, the characteristics of available team members, and social network connections of available team members to iteratively build a team that fills in gaps and satisfies the parameters of the opportunity/project.

According to at least one embodiment, input may be received by a system, whereby the input includes an opportunity (i.e., project) having a set of attributes/properties (e.g., opportunities won/lost), historical data of previous opportunities, geographical data relating to the opportunities/team members, and team member properties (i.e., team member data). The opportunity attributes may include opportunities won/lost, historical data of previous opportunities, geographical data relating to the opportunities/team members, prior opportunity data, prior opportunity performance data for each opportunity channel, prior collaborative opportunity data between one or more entities and one or more partners of the entity (e.g., business partners), social network data from the entities and the entity partners, or a combination thereof (e.g., social network, experience, and performance data from the business partners who have worked on similar opportunities, and/or social network, experience, and performance data from the entities (e.g., a sales team) who have worked on similar opportunities).

Then, the system generates a recommended entity partner (e.g., business partner) to own the opportunity along with a predicted opportunity win probability of the entity partner and predicted availability of the entity partner and load. A recommended team of members of the entity (e.g., sales team) may also be recommended to own the opportunity along with an opportunity predicted win probability of the recommended team of members and predicted availability of the BP and load. A channel (e.g., a sales channel or route) may be recommended to automatically pass a new opportunity to the recommended team of members and/or the entity partners according to account historical opportunity win rates (e.g., rates for securing opportunities), predicted availability of expertise and relationships with clients. The cognitive system may automatically manage the opportunity progression within specified timeframes.

The cognitive system may also generate team member profiles and/or entity partner profiles capturing properties such as relationships, knowledge relevant to the opportunity, social relationships, and performance/win rates. The system may then identify roles that may be used to fulfill the parameters of the opportunity. Thereafter, the identified roles may be ranked based on, for example, a role's importance in successful previous opportunities and a role may be selected from the ranked identified roles to fill. Finally, the system, or a user, iteratively selects team members and/or entity partners to build a team until a stopping criterion is satisfied. The opportunity's properties may be defined as a signature that, for example in a sales scenario, includes a client identifier (ID), client location, client or opportunity business domain, products and services of interest, and current team owner.

In one aspect, data may be collected from a knowledge domain relating to a plurality of entities/entity partners extracted from one or more data sources. In one aspect, data from one or more online data sources may be identified and/or processed using natural language processing (NLP) operations. A graphical user interface (GUI) (e.g., an interactive GUI) of a computing device may be used to display the cognitive recommendations, suggestions, or predictions for implementing intelligent opportunity recommendation and management.

In one aspect, an opportunity (e.g., a business opportunity) may be a "transactional operation" such as a sales opportunity or vendor-client relationship. An opportunity may also be where unmet and unarticulated needs are uncovered to create innovation opportunities. An opportunity may also include new or upgraded products and services that may be sold or products or services that do not exist. The opportunities may be identified for one or more entities of existing businesses, entities searching for increased growth opportunities, or entities wanting to explore strategic diversification. Thus, a client or "opportunity entity" may be an identified client or entity with whom a business opportunity may be available and any new openings or opportunities untouched by competitors, or it can be considered part of a remote and/or different industry or outside the boundaries of the firm. An opportunity may also include outcome(s) of customer-entity inquiries and a discovery process, that leads to new profit growth opportunities by defining potential gaps in existing markets. The opportunity may be an identified and/or entirely new market, or it can be used to map incremental innovation in products or service and/or a new source of customer value that can be translated to economic value.

It should be noted as described herein, the term "cognitive" (or "cognition") may be relating to, being, or involving conscious intellectual activity such as, for example, thinking, reasoning, or remembering, that may be performed using machine learning. In an additional aspect, cognitive or "cognition" may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, a cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with a high degree of accuracy (e.g., within a defined percentage range or above an accuracy threshold), speed and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Retain and recall relevant data points (images, text, voice) (e.g., a high degree of relevant recollection from data points (images, text, voice) (memorization and recall)); and/or 13) Predict and sense with situational awareness operations that mimic human cognition based on experiences.

Thus, the present invention may provide cognitive recommendations, according to user data analysis problems, that may retrieve and mine data sources (e.g., documents, web pages, websites, online journals, conference materials, scientific papers, etc.). One or more relevant methods and features associated with the methodology may be extracted from the mined data sources. In short, the system 1) retrieves one or more articles, 2) extracts one or more methods, and/or extracts one or more features associated with the extracted methods, and/or 3) collects various types of user feedback.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer may be able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
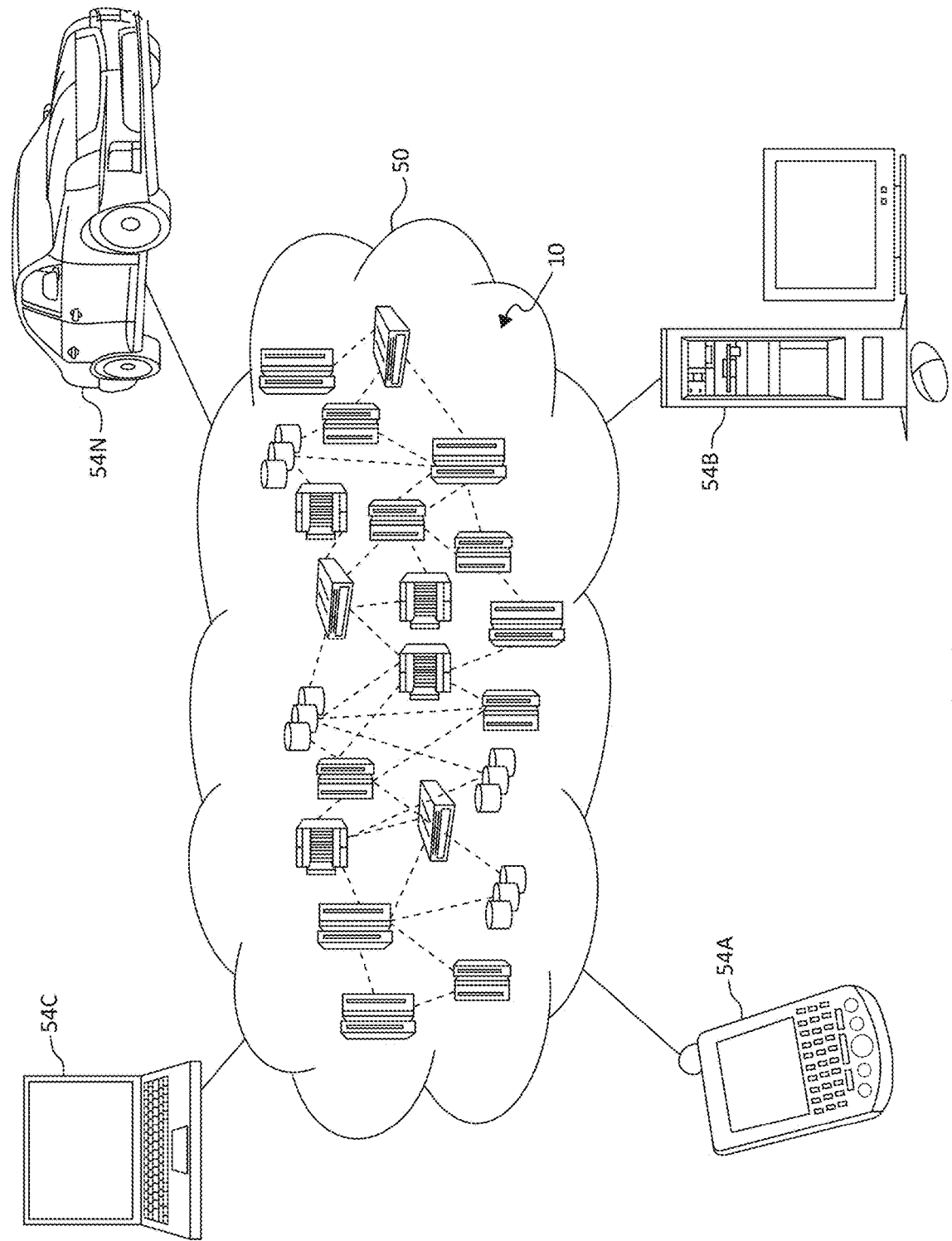
FIG. 2 is an additional block diagram depicting an exemplary cloud computing environment according to an embodiment of the present invention.
Figure 3:
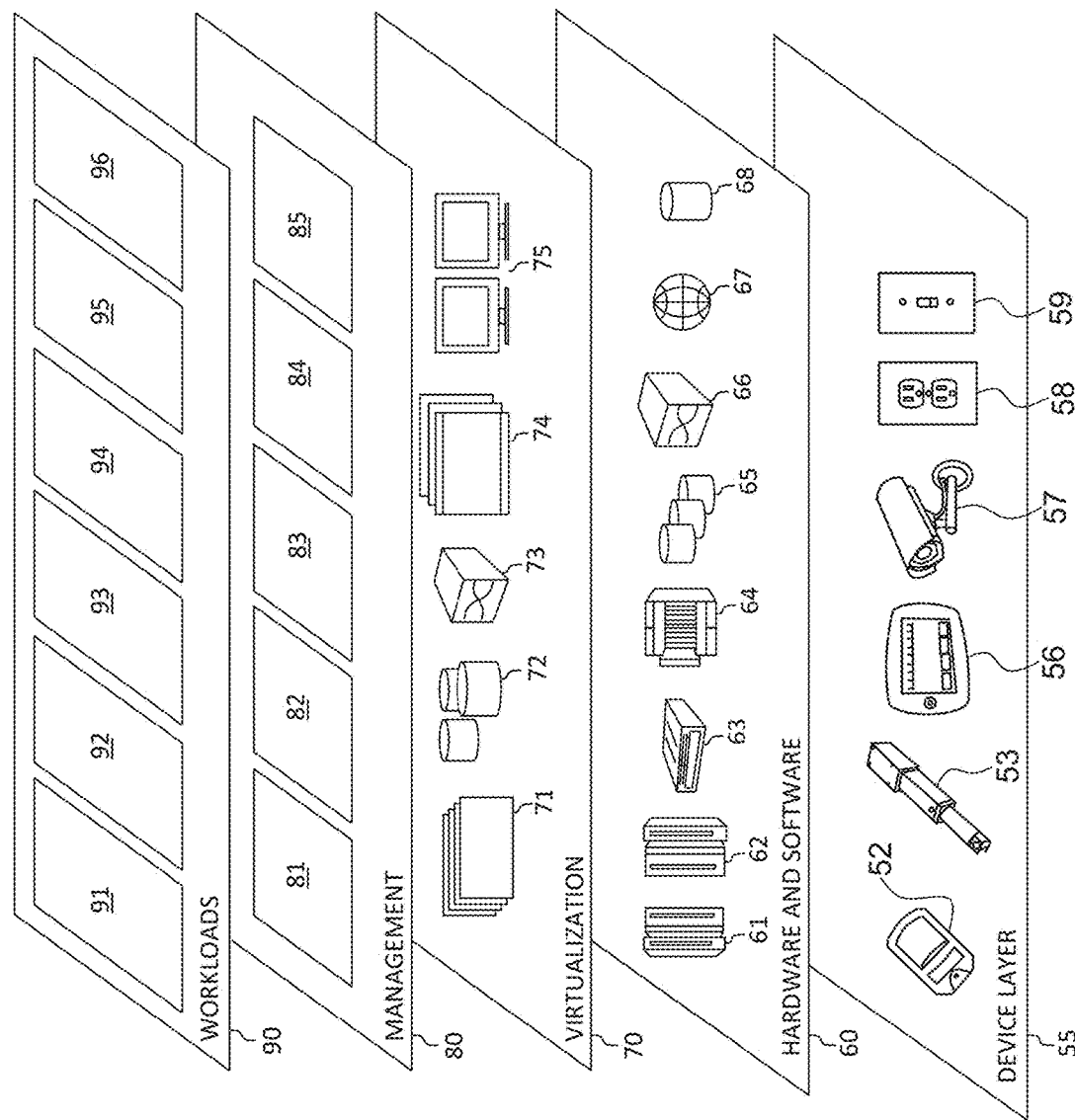
FIG. 3 is an additional block diagram depicting abstraction model layers according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser). Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities (including sensors and actuators) collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, process controller systems and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent opportunity recommendation and management. In addition, workloads and functions 96 for intelligent opportunity recommendation and management may include such operations as data analysis (including data collection and processing from various environmental sensors), and predictive data analytics functions. One of ordinary skill in the art will appreciate that the workloads and functions 96 for intelligent opportunity recommendation and management may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

Figure 4:
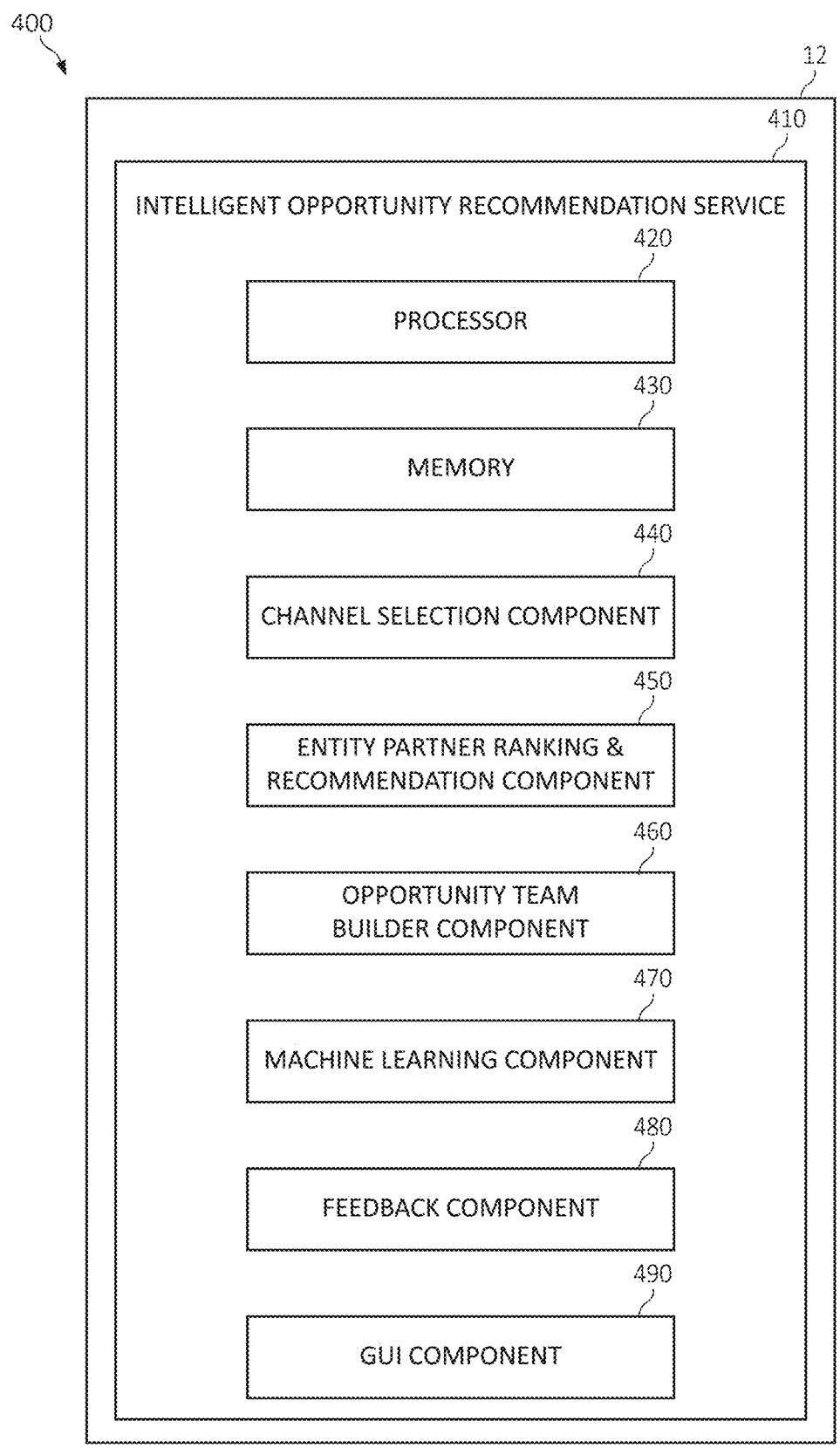
FIG. 4 is a diagram depicting various user hardware and computing components functioning in accordance with aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. An intelligent opportunity recommendation service 410 is shown, incorporating processing unit ("processor") 420 to perform various computational, data processing and other functionality in accordance with various aspects of the present invention. The intelligent opportunity recommendation service 410 may be provided by the computer system/server 12 of FIG. 1. The processing unit 420 may be in communication with memory 430. The intelligent opportunity recommendation service 410 may include a channel selection component 440, an entity partner ranking and recommendation component 450, an opportunity team builder ("OTB") component 460, a machine learning component 470, a feedback component 480, and a GUI component 490.

As one of ordinary skill in the art will appreciate, the depiction of the various functional units in intelligent opportunity recommendation service 410 is for purposes of illustration, as the functional units may be located within the intelligent opportunity recommendation service 410 or elsewhere within and/or between distributed computing components.

The channel selection component 440 may apply a channel selection model to a selected opportunity in view of a plurality of opportunity attributes to identify one or more team candidates of an entity or one or more entity partners ranked by alignment with the selected opportunity and determine a recommended opportunity owner from the one or more team candidates of the entity, the one or more entity partners, or a combination thereof.

In one aspect, a channel may include a sales channel (e.g., a means of selling to customers) and/or a distribution channel (e.g., means of delivering an obligations to a customer). In an additional aspect, a channel may be a means, path, conduit for delivering goods, services, products/and/or information. A channel may be a sales person, sales team, an entity, or a combination thereof. The channel (e.g., a sales channel or route) selection model may be a model to recommended automatically passing a new opportunity to the recommended team of members and/or the entity partners according to account historical opportunity win rates (e.g., rates for securing opportunities), predicted availability of expertise and relationships with clients. The cognitive system may automatically manage the opportunity progression within specified timeframes. The channel selection model may be a model that determines a channel. The channel selection model may be a model that enables allocating and managing a sales opportunity to a recommended team of members and/or the entity partners.

The channel selection component 440 may assign the selected opportunity to the one or more team candidates of the entity as the recommended opportunity owner, and/or reassign the selected opportunity from the one or more team candidates of the entity to the one or more entity partners as the recommended opportunity owner upon expiration of a selected time period.

The channel selection component 440 may further receive the selected opportunity along with the opportunity attributes, prior opportunity data, prior opportunity performance data for each opportunity channel, prior collaborative opportunity data between the one or more team candidates of the entity and the one or more entity partners, social network data from the one or more team candidates of the entity and the one or more entity partners, or a combination thereof. The channel selection component 440 select the opportunity channel for the selected opportunity.

Thus, the channel selection component 440 may apply/use a machine learning operation, deep learning, and/or mathematical optimization operations. For example, the mathematical optimization operations may include optimizing a load across each channel so as to take into account a business rules that may indicate an intention that 50% of the opportunities are to be managed by one or more business partners and to maximize a win probability across the channels while respecting some of the load constraints. Thus, the mathematical optimization operation may include one or more business rules that may be modeled and taken into account.

One or more inputs to the channel selection component 440 may be received such as, for example, opportunity attributes, historical opportunities, and/or channel or route performance. The channel selection component 440 may output/generate a recommended sales channel such as, for example, an entity partner/business partner ("BP"), team members of an entity (field sales "FS"), and/or digital sales "DS" channel that provide telephonic sales and/or sales via the internet) to pass/assign the opportunity (e.g., sales opportunity).

The OTB component 460 may build the recommended opportunity owner from the one or more team candidates of the entity, the one or more entity partners, or a combination thereof and assign the opportunity to the recommended opportunity owner.

Thus, the OTB component 460 may apply/use a graph network analysis and/or a machine learning operation. One or more inputs to the OTB component 460 may be received such as, for example, opportunity attributes, social network, experience, and performance data from team members of an entity who have worked on similar opportunities, a list of team members of an entity in the opportunity owner's social selling network. The OTB component 460 may output/generate a role recommendation (e.g., roles for a team of opportunity owners), a team recommendation, and/or an opportunity output prediction. The opportunity output prediction may include a machine learning model that takes into account one or more features of the opportunity such as a product, a client and team that are executing the sales opportunities and provides a win/lose probability. Thus, prior to adding an expert to the team for selling the product has a win probability may be 45%, but after adding the expert the composition of skills on the team has changed and is increased to 65% win probability.

The entity partner ranking and recommendation component 450 may rank each of the one or more entity partners, and/or assign the opportunity to one or more of the plurality of entity partners according to the ranking. The entity partner ranking and recommendation component 450 may assign a score (e.g., an assigned value, a value within a range of values, and/or a percentage value) to the one or more entity partners indicating a probability of securing ("win") an identified opportunity. The entity partner ranking and recommendation component 450 may rank each of the one or more entity partners according to the assigned score.

Thus, the entity partner ranking and recommendation component 450 may apply/use a machine learning operation, an elastic search, mathematical optimization operations, and/or a natural language processing ("NLP") operation. One or more inputs to the entity partner ranking and recommendation component 450 may be received such as, for example, opportunity attributes (e.g., opportunity wins/losses, etc.), goods/services (e.g., products available at different levels), geographical data, opportunity sectors/channels, prior collaborative opportunity data between the one or more team candidates of the entity and the one or more entity partners, social network data from the one or more team candidates of the entity and the one or more entity partners, or a combination thereof. The entity partner ranking and recommendation component 450 may output/generate a ranked list of entity partners (e.g., business partners) recommended to own the selected opportunity in order to maximize/optimize a win rate (e.g., maximize chances of securing the opportunity).

The feedback component 480 may collect feedback relating via an interactive graphical user interface (GUI) relating to one or more recommended the one or more team candidates of the entity, the one or more of the plurality of entity partners, or a combination thereof.

The machine learning component 470 may learn, determine, or identify the selected opportunity to the one or more team candidates of the entity as the recommended opportunity owner, and/or reassign the selected opportunity from the one or more team candidates of the entity to the one or more entity partners as the recommended opportunity owner upon expiration of a selected time period.

By way of example only, the machine learning component 470 may determine one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
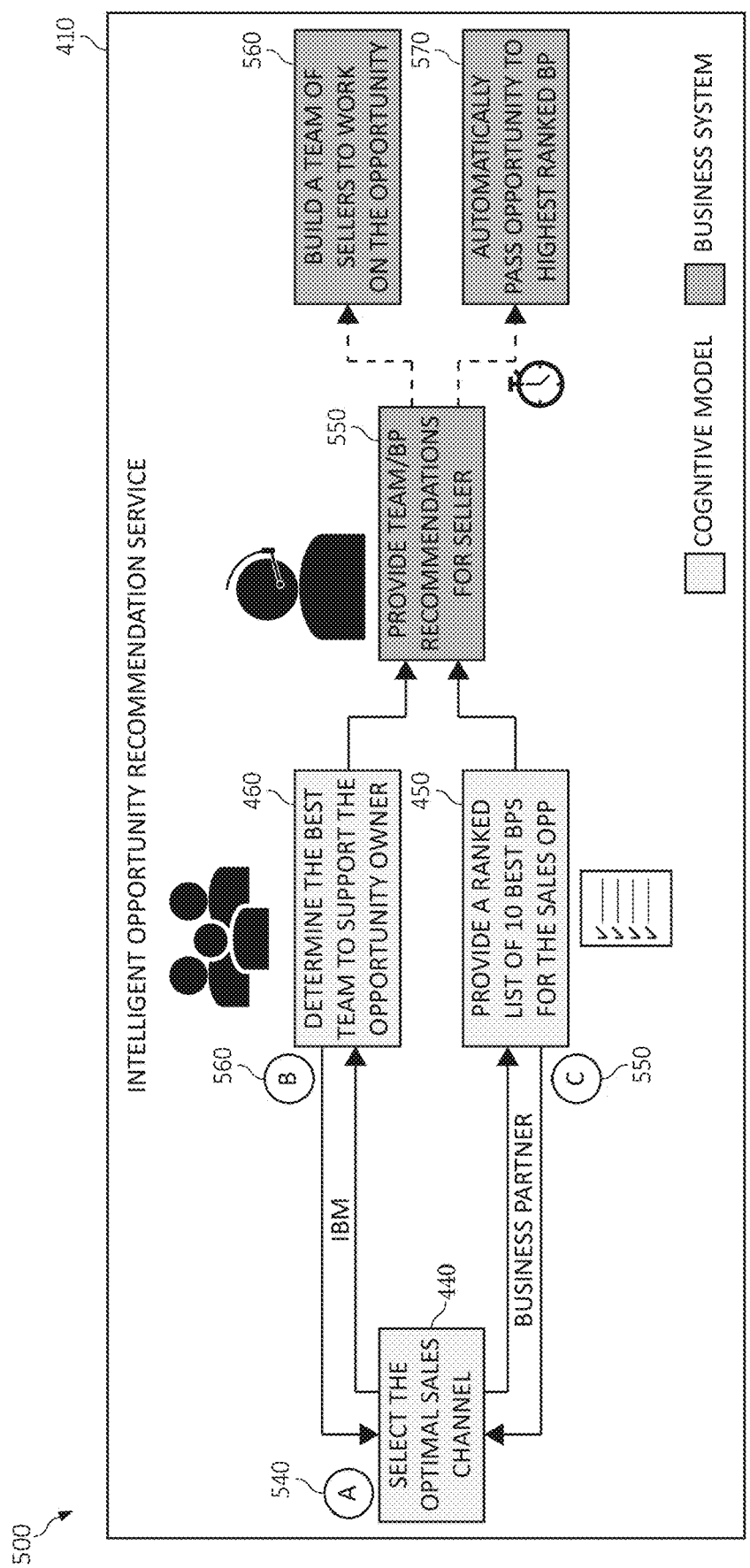
FIG. 5 is an additional block diagram depicting an exemplary functional relationship between various aspects of the present invention.

Turning now to FIG. 5, block/flow diagram 500 is depicting for managing regulatory compliance for an entity. In one aspect, one or more of the components, modules, services, applications, and/or functions described in FIGS. 1-4 may be used in FIG. 5. For example, computer system/server 12 of FIG. 1, incorporating processing unit 16, may be used to perform various computational, data processing and other functionality described in FIG. 5. Also, the intelligent opportunity recommendation service 410 may be implemented and used to illustrate the functionality and/or operations depicted in FIG. 5.

As illustrated in step A) or block 540, the channel selection component 440 (of FIG. 4) may select one or more optimal sales channels. That is, the channel selection component 440 may applying a channel selection model to a selected opportunity for one or more team candidates of an entity or one or more entity partners ranked by alignment with the selected opportunity. In other words, the channel selection component 440 may select a sales channel between field sales, digital sales and/or entity/business partner for a sales opportunity. The channel selection component 440 may consumes the output of step B) of the OTB component 460 (of FIG. 4) and/or step C) of the entity partner ranking and recommendation component 450 (of FIG. 4) to further evaluate the optimal sales channel based on the 1) available expertise, entity partners and/or teams of the entity, and/or 2) the availability and load of the suggested owner.

Thus, as a new opportunity comes into (e.g., received by) the channel selection component 440, the channel selection component 440 may use a channel selection model to decide which opportunity channel/route to select. If a highest opportunity win probability (e.g., a win probability is 50% through a selected channel (e.g., a partner channel) as compared to 30% win probability through other channels) may be determined to be through the entity/business partner channel (e.g., step C), the entity partner ranking and recommendation component 450 may be triggered to send a top "K" number of entity/business partners to the opportunity owner recommending who to pass the lead to along with explanations on why the top "K" number of entity/business partners were selected. It should be noted that once an opportunity has been identified by a seller, the identified opportunity may be referred to as the opportunity identifier. The opportunity identifier may not fulfill the opportunity (e.g., sales deal) so the opportunity owner may pass responsibility to win the opportunity to an opportunity owner who needs to manage the deal to completion (e.g., a seller/team member that manages/secures the win opportunity is identified as the "opportunity owner").

In step B) or block 560, the OTB component 460 may provide a list of one or more team candidates of an entity (e.g., field sales team, digital sales team, etc.) recommended to be on the opportunity team. Said differently, the OTB component 460 may determine a selected team to support an owner of an opportunity.

In step C) or block 550, the entity partner ranking and recommendation component 450 may determines the eligibility of each of the entity/business partners ("BPs"). The entity partner ranking and recommendation component 450 may provide a ranked list of a selected number of the entity/business partners (e.g., best or top ranked/highest performing entity/business partners in winning opportunities) to pursue a sales opportunity.

Using the data from the entity partner ranking and recommendation component 450 and the OTB component 460, a recommendations of one or more team candidates of an entity and/or the entity/business partners may be provided/recommended, as in block 550. A team of candidates (e.g., "sellers") of an entity may be assembled/built to work on the opportunity, as in block 560. In one aspect, a time period for responding/accepting the assignment to work on the opportunity may be set/scheduled. Thus, upon expiration of the selected time period, the opportunity may be passed/reassigned to one or more of a ranked number of the entity/business partners (e.g., a highest rated/ranked number of entity/business partners "BPs"), as in block 570. Said differently, the team of candidates (e.g., sellers) are given a deadline by which if they respond, the opportunity may be automatically passed/reassigned to a selected number of ranked entity/business partners. The OTB component 460 may recommends a team for a given opportunity according to the channel selection of the channel selection component 440 and entity/business partner ranking results performed by the entity partner ranking and recommendation component 450. If the team of candidates is sub-optimal (e.g., a predicted win probability is less than a threshold or recommended value of the recommended team) or unavailable, the information may feed back to the channel selection component 440 to make an alternative channel/route selection in a refined search space.

In view of the forgoing and the critical role of the OTB component 460 of FIGS. 4-5, consider the following additional functionality and operations of the OTB component 460. That is, the intelligent opportunity recommendation service 410 incorporates the OTB component 460 and may use an algorithm which takes output from the channel selection model of the channel selection component 440.

Figure 6:
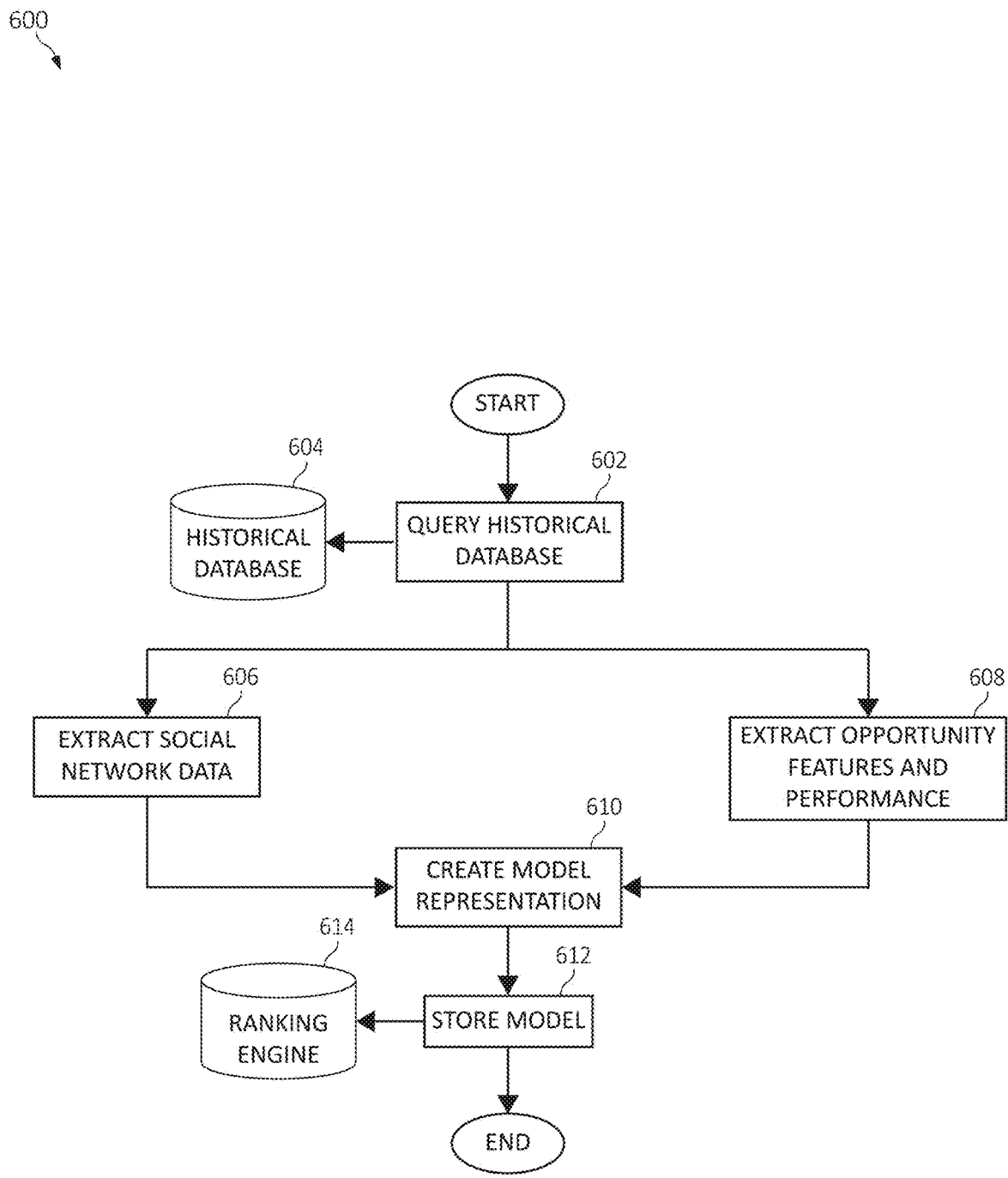
FIG. 6 is a flowchart diagram of an exemplary method implementing intelligent opportunity recommendation and management by a processor, in which various aspects of the illustrated embodiments may be implemented.

Referring now to FIG. 6, an operational flowchart illustrating the exemplary recommendation model formation process 600 (e.g., recommending one or more team candidates of an entity (e.g., field sales team, digital sales team, etc.) to be on the opportunity team) using the OTB component 460 according to at least one embodiment is depicted.

At 602, a historical database 604 is queried to retrieve data relating to persons involved with prior opportunities (e.g., sales representatives). A list of prior opportunities (e.g., sales opportunities or other team projects using) may be generated or received by the recommendation model formation process 600. From the list of prior opportunities, a list of persons involved with those opportunities may be created. Thereafter, a query may be generated to retrieve data (i.e., prior opportunity data) relating to the sellers (i.e., team members or persons) involved with the opportunities identified within the list of prior opportunities by the recommendation model formation process 600 and transmitted to a relational database, such as the historical database 604.

According to at least one other embodiment, data resulting from the query may be cached, in whole or in part, in another storage system for performance benefits while building the model (e.g., an evidence-based model). The query may be generated to conform to the input format used by the historical database 604 to create a compatible query. More specifically, the query may request opportunity data describing the opportunities the sellers have been involved with previously (including opportunities not included in the original list of prior opportunities). Queries to the historical database 604 may be transmitted via a communication network (see FIGS. 1-3) to the computer system/server 12 of FIGS. 1 and 4 controlling the historical database 604 in instances where the historical database 604 may be on a separate device apart from the computer system/server 12 running the opportunity team builder component 460. Later, the results of the query may be received via the communication network. Opportunity data may include who filled the roles for opportunities, the products involved with the opportunity, the location of the team members, data indicating the success or failure of the opportunity, the client involved in the opportunity, and other opportunity-related data.

For example, a list of prior sales opportunities is generated that includes opportunity O1, opportunity O2, and opportunity O3. A query may then be sent to the historical database 204 to retrieve the sellers involved with opportunities O1-O3. The query results may indicate that Doug, Jane, Nicole, Jim, and Todd worked on at least one of opportunity O1, opportunity O2, or opportunity O3. Thereafter, the historical database 604 is queried to find the opportunities that Doug, Jane, Nicole, Jim, and Todd worked on and attendant opportunity data.

At 606, social network data is extracted from the received opportunity data. Social network data may be extracted from the opportunity data based on the sellers or other persons involved with a prior opportunity. Continuing the previous example, based on the opportunity data, Todd worked on opportunity O2 with Jane and Doug and opportunity O4 with Jane and Maggie. Thus, Todd's social network will include Jane, Doug, and Maggie. Furthermore, additional levels of the social network may be extracted and added to a seller's social network by adding the social networks of the other sellers to the original seller's social network. Continuing the above example, an additional social network level is added to Todd's social network by incorporating the social network of Jane. Thus, if Jane has Martin, Doug, Mary, and Jill in her social network, Todd's social network will add Martin, Mary, and Jill (i.e., the people in Jane's social network that are not already in Todd's social network). The same process may continue for the other members of Todd's social network to build the second level of the social network. In like manner, additional social network levels may be added to the original seller's social network.

At 608, opportunity features and performance data is extracted from the received opportunity data. From the previous opportunity data stored in the historical database 604, the features of an opportunity and the resulting success of the opportunity may be extracted. Opportunity attributes/features (i.e., opportunity attribute/feature data) may include the products involved, the people involved in the opportunity and their roles, the industry and sector involved, the client, the client location, the team's location, and the like. The opportunity data may be stored in the historical database 204 and organized in the subsequent retrieved data by opportunity.

Continuing the previous example, opportunity features and performance data are extracted from the opportunities (i.e., O1-O4) associated with the original list of people (i.e., Doug, Jane, Nicole, Jim, and Todd). From opportunity O2, the features may include a sector of services such as, for example, financial services, an industry of banking, a client C, a client location of Canada, and products involved including Cloud Services and Statistics Module. The sellers and roles extracted from the opportunity data from O2 may include Todd as Client Representative, Jane as Software Architect, and Doug as Line Item Owner. The extracted opportunity performance for O2 may be success. In like manner, the opportunity features, sellers, roles, and performance data may be extracted for the remaining opportunities (i.e., O1, O3, and O4).

According to at least one embodiment, opportunity attributes/features and performance data may be extracted at 608 concurrently with extracting social network data at 606. According to at least one other embodiment, extracting opportunity features and performance data at 208 may occur before or after extracting social network data at 606.

Next, at 610, a model representation is created based on the extracted data. A model may be created whereby opportunity data may be organized by seller. For example, the opportunity data from opportunities O2 and O4 extracted before at 608 may be linked to Todd or added to an entry for Todd. Furthermore, Todd's social network data extracted at 606 may also be added to the entry for Todd in the created model. The model representation may be embodied as textual data.

Then, at 612, the created model is stored in an evidence-based ranking engine 614. The textual data forming the model representation created previously at 610 may be added to (i.e., stored in) a search platform, such as Apache Solr™ (Apache Solr and all Apache Solr-based trademarks and logos are trademarks or registered trademarks of the Apache Software Foundation and/or its affiliates) for subsequent searching by the recommendation model usage process which will be described in greater detail below with respect to FIG. 7. The search platform may store the model in a data repository. The data repository may be located apart from the computer system/server 12 running the opportunity team builder component 460 and may be accessed by the opportunity team builder component 460 via a communication network.

Figure 7:
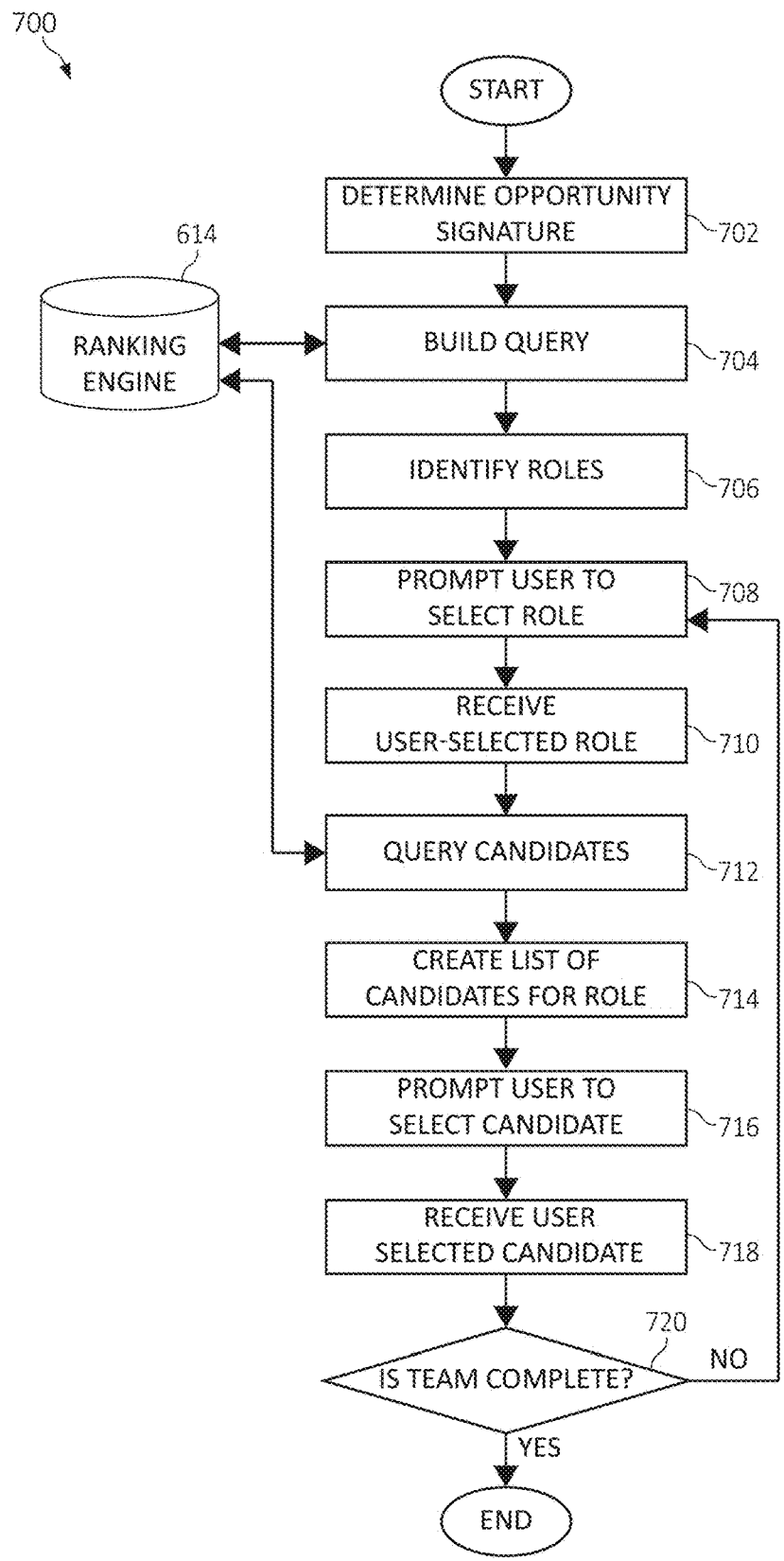
FIG. 7 is an additional flowchart diagram of an exemplary method implementing intelligent opportunity recommendation and management by a processor, in which various aspects of the illustrated embodiments may be implemented.

Referring now to FIG. 7, an operational flowchart illustrating the exemplary recommendation model usage process 700 used by the opportunity team builder component 460 according to at least one embodiment is depicted.

At 702, an opportunity signature is determined for the current opportunity. The opportunity signature may include the opportunity attributes/features of the current opportunity for which a team is being assembled. The attributes/features of the current opportunity may include information similar to the opportunity attributes/features of prior opportunities described previously, such as sector, industry, client, location, and products involved. The opportunity signature may be received as user input or derived automatically. In the case of user input, a user interface may be implemented in, for example, JavaScript® (JavaScript and all JavaScript-based trademarks and logos are trademarks or registered trademarks of the Oracle Corporation and/or its affiliates) that provides a way for a user to input opportunity features as text through text fields, drop down lists, and the like.

The user interface may be displayed by a user's computer in association with the GUI component 490 of FIG. 4, such as a web browser in the case of a web-based interface, that may display the user interface and collect the subsequent responses from the user. The collective responses from the user as entered in the user interface may constitute the opportunity's signature or features and may then be sent to the computer system/server 12/GUI component 490 or other device running the opportunity team builder component 460. Automatic opportunity signature determination may be implemented through analysis of a database of computer system/server 12 or other storage containing available opportunities and the data (i.e., attributes/features) describing the opportunities.

For example, a web-based interface (e.g., GUI component 490 of FIG. 4) may be presented to the user as part of the opportunity team builder component 460. The interface may include text boxes for user input. Multiple text boxes may be used to collect data including the opportunity name, the sector, the industry, the name of the lead person or team owner for the opportunity, the client, and the products involved. If Jill is the user, Jill may enter "Bank B" as the opportunity name, "Financial Serves" as the sector, "Banking" as the industry, "Jill" as the team owner, "Bank B" as the client, and "Cloud Services" and "Statistics Module" as the products into the interface. Thereafter the interface may collect the entered text and organize the text into a predefined format as an opportunity signature for the current opportunity. The opportunity signature may then be transmitted via a communication network to computer system/server 12 running the opportunity team builder component 460.

Next, at 704, a query is built for searching the model stored in the ranking engine 714. The query may begin as a string based on the opportunity signature determined previously at 702. The query may be built and formatted according to the syntax dictated by the ranking engine 314. Additionally, the query may be built to request data related to prior opportunities that may be similar to the current opportunity based on the current opportunity's signature. After building the query, the query may be transmitted to the ranking engine 714 via a communication network associated with computer system/server 12. The ranking engine 714 may process the query, search the model representation based on the query, and return the results of the query to the opportunity team builder component 460. Queries to the ranking engine may utilize Java® (Java and all Java-based trademarks and logos are trademarks or registered trademarks of the Oracle Corporation and/or its affiliates) Representational State Transfer (REST) application programming interfaces (APIs). If the query results are too restrictive due to the constraints (i.e., parameters), another query may be generated whereby some of the constraints may be relaxed (e.g., revise the query to include any sector) or granularity may be increased (e.g., product levels) to produce results with sufficient content.

Then, at 706, relevant job roles for the current opportunity are identified. From the results of the query, data related to the current opportunity may be returned. Within the related data may be data regarding previous opportunities that may be similar to the current opportunity. The job roles that were part of the teams that worked on similar opportunities in the past may be identified and collected to form a list of job roles. Then, the job roles may be ranked based on a weight assigned to each role. The weights assigned to the roles may be calculated based on the success of the previous opportunities. For example, if many successful previous opportunities had a Line Item Owner role and only few successful previous opportunities had an Associate Opportunity Owner role, then the Line Item Owner role would be weighted higher relative to the Associate Opportunity Owner role in the list of roles. A list of relevant job roles may then be generated, for example, as a subset of the list of roles with weights above a threshold value. Subsequent iterations may remove job roles from the list of relevant job roles as team members are selected to fill job roles as will be described in further detail below.

At 708 the list of relevant job roles is presented to the user and the user is prompted to select a role to fill in the team for the current opportunity. The user may be presented with the list of relevant job roles within an interface, such as a web-based interface. A list of relevant jobs may be transmitted to the user's computer via the communication network of computer system/server 12/GUI component 490 and presented using an application program, such as a web browser. The list of relevant job roles may be displayed along with a numerical, visual (e.g., color, shape, size, or font) or other indication of the weight assigned to the job role. Thereafter, the user may interact with the presented list (e.g., through a mouse click or tapping on a touchscreen) to select a job role to fill.

Next, at 710, the opportunity team builder component 460 receives data indicating the job role the user selected in response to the presented list of relevant job roles. Once the user selects a job role, the resulting selection may be transmitted to the opportunity team builder component 460 via the communication network associated with computer system/server 12.

At 712, the model stored in the ranking engine 714 is queried based on the user-selected role. Once the user has selected a role to fill, a query may be generated to retrieve candidates and candidate evidence data for filling the selected role. Candidate evidence data may include historical data indicating the candidate's prior experience and successes in prior opportunities (e.g., products the candidate worked with, roles the candidate had, successes, and social network). According to at least one embodiment, the query may specifically target sellers that have held the job role selected or meet predefined criteria indicating the seller may be successful in the role without having held the role before. The query may be transmitted to the ranking engine 714 as described previously and the query results may be returned containing candidate sellers and the evidence data for the candidate sellers. For example, if the user selected Line Item Owner as the role to fill, a query will be generated to identify and retrieve candidate sellers for filling the Line Item Owner role. The opportunity team builder component 460 will then transmit the query to a server 112 administering the ranking engine 614 over a communication network 116. The server 112 will then query the ranking engine 214 using the received query and thereafter the results of the query produced by the ranking engine 214 are transmitted to the computer system/server 12 and/or computer of a user (see various types of computers of FIG. 3) running the opportunity team builder component 460 over a communication network associated with computer system/server 12.

Then, at 714, a list of candidate sellers is created for filling the user-selected job role. Using the results from the query that includes the seller data corresponding with previous opportunities as described above with respect to FIG. 6, a pool of sellers may be determined. The pool of sellers (i.e., team member candidates) may be ranked based on evidence related to the features of the current opportunity and previous successes. More specifically, the number of successful opportunities a candidate seller has worked on that involved a product in the current opportunity may be scored. Totals for the amount of successful opportunities overall and the amount of times the candidate seller has performed the role selected for filling may also be calculated. Additionally, using social network data extracted earlier, the number of times the candidate seller worked directly with members of the current seller team selected for the current opportunity in the course of previous opportunities may be determined. Similarly, the number of times a candidate seller worked indirectly with members of the current team selected for the current opportunity in the course of previous opportunities may be determined using social network data. Working indirectly with members of the current seller team may include the number of sellers a candidate seller has worked with that have worked directly with members of the current seller team. Based on the numerical values determined for the candidate sellers, the list of candidate sellers may be ranked and sorted based on the rank. The candidate sellers may be ranked based on the scores corresponding with the evidence for individual candidate sellers and comparing the score values for the candidate sellers.

At 716, the user is prompted to select a candidate seller to add to the team. The user may be presented with the list of candidate sellers within an interface, such as a web-based interface. The list of candidate sellers may be transmitted to the user's computer (see FIGS. 1-3) via a communication network associated with computer system/server 12 and presented using an application program, such as a web browser. The list of candidate sellers may, for example, be displayed in ranked order with the highest ranked candidate first. Furthermore, candidate sellers with ranked values below a threshold value may be excluded or the top X candidates may be shown (where X is a predefined value). Thereafter, the user may interact with the presented list (e.g., through a mouse click or tapping on a touchscreen) to select a candidate seller to fill the selected job role.

According to at least one embodiment, the user may also have the option to adjust the weight of evidence categories. For example, if the user decides that knowledge of the "Statistics Module" product is important for filling a role (or for the team in general), the user may add more weight to that category. Thus, candidates with more experience in successful opportunities involving the "Statistics Module" product may be ranked higher as the evidence score for that category is boosted. If the user sets the weight of the "Statistics Module" product category to a weight of 10, the evidence values for the candidate sellers in that category may be multiplied by 10 and the list may be re-ranked and subsequently reordered. User adjustments to category weight may be logged and tacked to determine weight adjustments over time to later suggest to the user that, based on the history of prior adjustments, the user may wish to adjust the category weights accordingly. Alternatively, the opportunity team builder component 460 may automatically adjust weights based on historical adjustments or projected adjustment trends based on the historical adjustment data.

Next, at 718, the opportunity team builder component 460 receives data indicating the candidate seller the user selected to fill the previously selected job role in response to the presented list of candidate sellers. Once the user selects a candidate seller, the resulting selection may be transmitted to the opportunity team builder component 460 via a communication network associated with computer system/server 12. Thereafter, the selected candidate may be assigned to the current seller team and the selected candidate may be assigned to the selected job role. Furthermore, the selected candidate may be removed from consideration for filling additional roles within the team.

At 720 the opportunity team builder component 460 determines if the team is complete. The opportunity team builder component 460 may determine that the team is complete based on receiving data from the user indicating that the team is complete or automatically based on a stopping criterion. According to at least one embodiment, the user may indicate the team is complete by interacting with an interface feature, such as button designated to indicate when the team is complete. For example, a web-based interface may include a button within a dialog box that is presented to the user after selecting a candidate asking if the team is now complete. It may be appreciated that other methods for soliciting a user's decision may be used. The stopping criterion may include the team reaching a predefined maximum team size. Alternatively, the stopping criterion may include determining that knowledge and target criteria have been met based on generating scores corresponding with the evidence values of the selected sellers making up the team and comparing the scored evidence values to predefined target values.

If the opportunity team builder component 460 determined that the team is complete, then the opportunity team builder component 460 may end. However, if the opportunity team builder component 460 determined that the team is not complete, then the opportunity team builder component 460 may return to 708 may prompt the user to select another team role to fill. Thus, the user may fill the roles of the team iteratively until a complete team has been selected to form the basis for the team recommendation. The team recommendation may then be presented to the user, sent to another person (e.g., a manager), or sent to another program for processing or other use.

Figure 8:
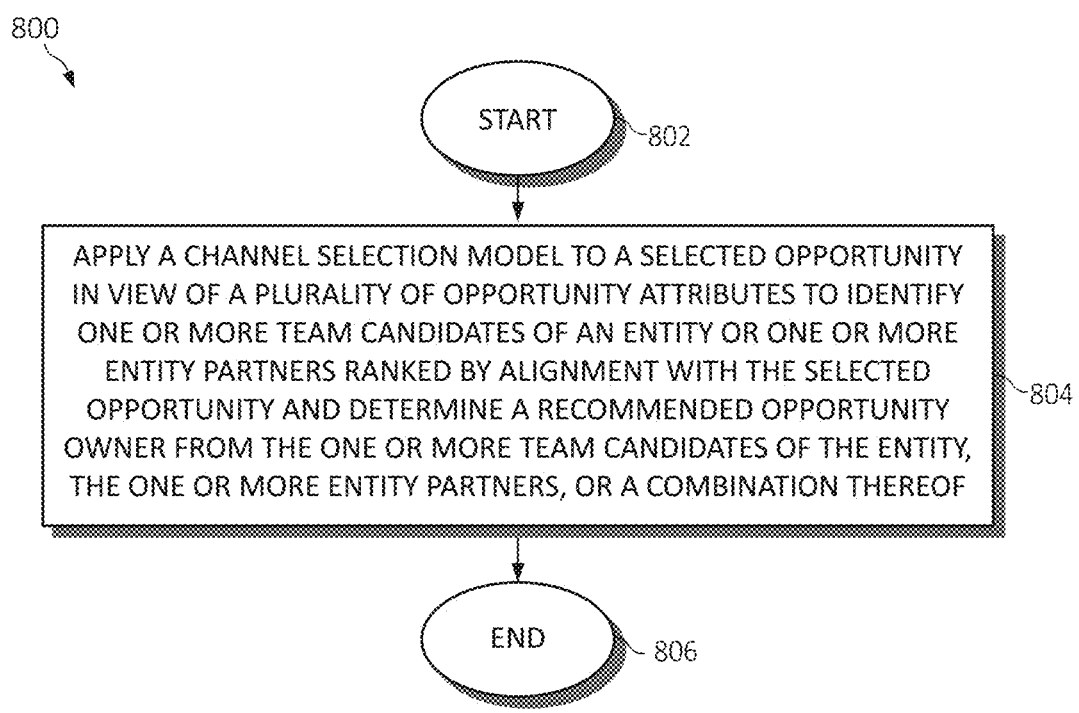
FIG. 8 is an additional flowchart diagram of an exemplary method implementing intelligent opportunity recommendation and management by a processor, in which various aspects of the illustrated embodiments may be implemented.

FIG. 8 is a flowchart diagram of an exemplary method for intelligent opportunity recommendation and management by a processor, in which various aspects of the illustrated embodiments may be implemented. The functionality 800 may be implemented as a method executed as instructions on a machine, where the instructions are included on at least one computer readable storage medium or one non-transitory machine-readable storage medium.

The functionality 800 may start in block 802. A channel selection model may be applied to a selected opportunity in view of a plurality of opportunity attributes to identify one or more team candidates of an entity or one or more entity partners ranked by alignment with the selected opportunity and determine a recommended opportunity owner from the one or more team candidates of the entity, the one or more entity partners, or a combination thereof, as in block 804. The functionality 800 may end in block 806.

Figure 9:
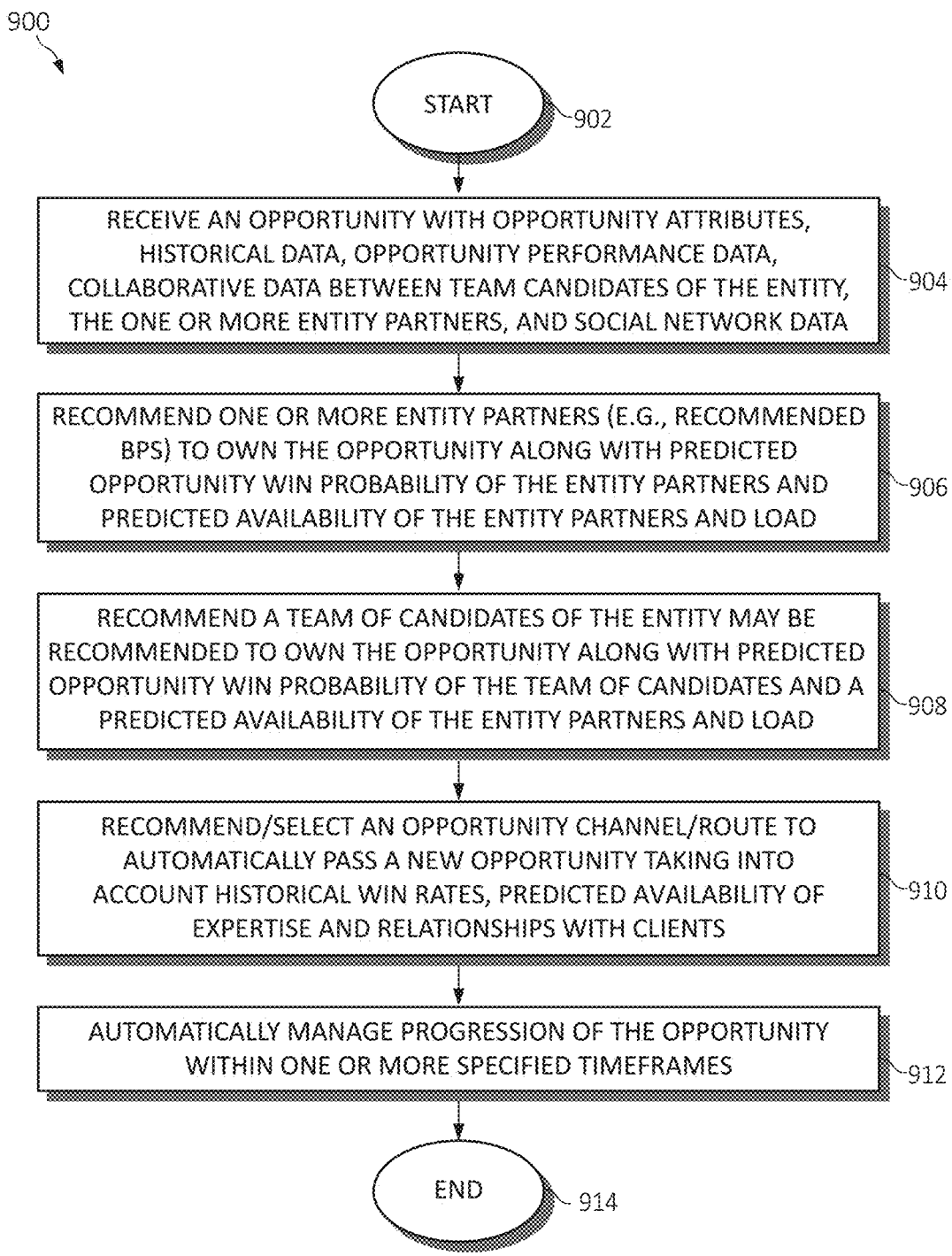
FIG. 9 is still an additional flowchart diagram of an exemplary method implementing intelligent opportunity recommendation and management by a processor, in which various aspects of the illustrated embodiments may be implemented.

FIG. 9 is a flowchart diagram of an additional exemplary method for intelligent opportunity recommendation and management by a processor, in which various aspects of the illustrated embodiments may be implemented. The functionality 900 may be implemented as a method executed as instructions on a machine, where the instructions are included on at least one computer readable storage medium or one non-transitory machine-readable storage medium. The functionality 900 may start in block 902.

An opportunity with opportunity attributes, historical data, opportunity performance data, collaborative data between team candidates of the entity, the one or more entity partners, and social network data may be received, as in block 904. One or more entity partners (e.g., recommended BPs) may be recommended to own the opportunity along with predicted opportunity win probability of the entity partners and predicted availability of the entity partners and load, as in block 906. A team of candidates of the entity may be recommended to own the opportunity along with predicted opportunity win probability of the team of candidates and a predicted availability of the entity partners and load, as in block 908. An opportunity channel/route may be recommended/selected to automatically pass a new opportunity, which may take into account historical win rates, predicted availability of expertise and relationships with clients, as in block 910. The opportunity progression may be automatically managed within one or more specified timeframes, as in block 912. The functionality 900 may end in block 914.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for implementing intelligent opportunity recommendation and management by a processor, comprising:
receiving a query from a user, via a graphical user interface (GUI), having input descriptive information of a selected opportunity comprising a sales transaction for a specific service or product between an entity and an alternative entity as indicated in the descriptive information received as input from the user, wherein a team of individuals represents the entity during the sales transaction, and wherein the team of individuals representing the entity during the sales transaction is not yet defined when the query is received;
responsive to receiving the query, receiving opportunity data representative of the selected opportunity, wherein the opportunity data includes a plurality of opportunity attributes indicative of the descriptive information of the selected opportunity;
receiving historical opportunity data representative of prior opportunity data having prior opportunity attributes similar to the plurality of opportunity attributes of the selected opportunity, wherein the historical opportunity data is inclusive of prior opportunity performance data representative of a sales completion rate of transactions similar to the sales transaction by particular individuals associated with the entity;
training, in a first stage via a machine learning mechanism, an artificial neural network used to generate a channel selection model using the opportunity data and the historical opportunity data, wherein training the channel selection models includes extracting and analyzing the plurality of opportunity attributes and the prior opportunity attributes as features organized according to the prior opportunity performance data of a plurality of team candidates selected from the particular individuals for the team of individuals of the entity or a plurality of entity partners;
applying the trained artificial neural network having generated the channel selection model to the selected opportunity in view of the plurality of opportunity attributes to identify a subset of the plurality of team candidates of the entity or a subset of the plurality of entity partners ranked by alignment with the selected opportunity and determine a recommended opportunity owner from the subset of the plurality of team candidates of the entity, the subset of the plurality of entity partners, or a combination thereof, wherein the subset of the plurality of entity partners is selected over the subset of the plurality of team candidates of the entity when the channel selection model indicates that the subset of the plurality of entity partners has a higher predicted sales completion rate for the selected opportunity than the subset of the plurality of team candidates, and wherein the channel selection model indicates whether the sales transaction for the specific service or product should be pursued by the subset of the plurality of team candidates of the entity or a subset of the plurality of entity partners through field sales or digital sales based on a predicted probability of securing the sales transaction through the field sales or the digital sales is above a predetermined threshold;
displaying the subset of the plurality of team candidates of the entity or the subset of the plurality of entity partners ranked by the alignment with the selected opportunity and the recommended opportunity owner as output to the query, via the GUI, according to the application of the trained artificial neural network having generated the channel selection model, wherein the displaying includes presenting a top K number of the subset of the plurality of team candidates of the entity or the subset of the plurality of entity partners and an explanation presented in natural language as to a reasoning of why each of the top K number were selected;
receiving feedback data via the GUI relating to the sales completion rate and the recommended opportunity owner of the selected opportunity from the subset of the plurality of team candidates of the entity, the subset of the plurality of the plurality of entity partners, or a combination thereof; and re-training, in a second stage via the machine learning mechanism, the artificial neural network using the feedback data to iteratively update the channel selection model.

2. The method of claim 1, further including:
assigning the selected opportunity to the subset of the plurality of team candidates of the entity as the recommended opportunity owner; or
reassigning the selected opportunity from the subset of the plurality of team candidates of the entity to the subset of the plurality of entity partners as the recommended opportunity owner upon expiration of a selected time period.

3. The method of claim 1, wherein the historical opportunity data further includes prior collaborative opportunity data between the plurality of team candidates of the entity and the plurality of entity partners, social network data from the plurality of team candidates of the entity and the plurality of entity partners, or a combination thereof.

4. The method of claim 1, further including selecting the opportunity channel for the selected opportunity.

5. The method of claim 1, further including:
building the recommended opportunity owner from the subset of the plurality of team candidates of the entity, the subset of the plurality of entity partners, or a combination thereof; and
assigning the opportunity to the recommended opportunity owner.

6. The method of claim 1, further including:
ranking each of the subset of the plurality of entity partners; and
assigning the opportunity to one or more of the subset of the plurality of entity partners according to the ranking.

7. A system for implementing intelligent opportunity recommendation and management, comprising:
one or more computers with executable instructions that when executed cause the system to:
receive a query from a user, via a graphical user interface (GUI), having input descriptive information of a selected opportunity comprising a sales transaction for a specific service or product between an entity and an alternative entity as indicated in the descriptive information received as input from the user, wherein a team of individuals represents the entity during the sales transaction, and wherein the team of individuals representing the entity during the sales transaction is not yet defined when the query is received; responsive to receiving the query, receive opportunity data representative of the selected opportunity, wherein the opportunity data includes a plurality of opportunity attributes indicative of the descriptive information of the selected opportunity;
receive historical opportunity data representative of prior opportunity data having prior opportunity attributes similar to the plurality of opportunity attributes of the selected opportunity, wherein the historical opportunity data is inclusive of prior opportunity performance data representative of a sales completion rate of transactions similar to the sales transaction by particular individuals associated with the entity;
train, in a first stage via a machine learning mechanism, an artificial neural network used to generate a channel selection model using the opportunity data and the historical opportunity data, wherein training the channel selection models includes extracting and analyzing the plurality of opportunity attributes and the prior opportunity attributes as features organized according to the prior opportunity performance data of a plurality of team candidates selected from the particular individuals for the team of individuals of the entity or a plurality of entity partners;
apply the trained artificial neural network having generated the channel selection model to the selected opportunity in view of the plurality of opportunity attributes to identify a subset of the plurality of team candidates of the entity or a subset of the plurality of entity partners ranked by alignment with the selected opportunity and determine a recommended opportunity owner from the subset of the plurality of team candidates of the entity, the subset of the plurality of entity partners, or a combination thereof, wherein the subset of the plurality of entity partners is selected over the subset of the plurality of team candidates of the entity when the channel selection model indicates that the subset of the plurality of entity partners has a higher predicted sales completion rate for the selected opportunity than the subset of the plurality of team candidates, and wherein the channel selection model indicates whether the sales transaction for the specific service or product should be pursued by the subset of the plurality of team candidates of the entity or a subset of the plurality of entity partners through field sales or digital sales based on a predicted probability of securing the sales transaction through the field sales or the digital sales is above a predetermined threshold;
display the subset of the plurality of team candidates of the entity or the subset of the plurality of entity partners ranked by the alignment with the selected opportunity and the recommended opportunity owner as output to the query, via the GUI, according to the application of the trained artificial neural network having generated the channel selection model, wherein the displaying includes presenting a top K number of the subset of the plurality of team candidates of the entity or the subset of the plurality of entity partners and an explanation presented in natural language as to a reasoning of why each of the top K number were selected;
receive feedback data via the GUI relating to the sales completion rate and the recommended opportunity owner of the selected opportunity from the subset of the plurality of team candidates of the entity, the subset of the plurality of the plurality of entity partners, or a combination thereof; and
re-train, in a second stage via the machine learning mechanism, the artificial neural network using the feedback data to iteratively update the channel selection model.

8. The system of claim 7, wherein the executable instructions further:
assign the selected opportunity to the subset of the plurality of team candidates of the entity as the recommended opportunity owner; or
reassign the selected opportunity from the subset of the plurality of team candidates of the entity to the subset of the plurality of entity partners as the recommended opportunity owner upon expiration of a selected time period.

9. The system of claim 7, wherein the historical opportunity data further includes prior collaborative opportunity data between the plurality of team candidates of the entity and the plurality of entity partners, social network data from the plurality of team candidates of the entity and the plurality of entity partners, or a combination thereof.

10. The system of claim 7, wherein the executable instructions further select the opportunity channel for the selected opportunity.

11. The system of claim 7, wherein the executable instructions further:
   build the recommended opportunity owner from the subset of the plurality of team candidates of the entity, the subset of the plurality of entity partners, or a combination thereof; and
   assign the opportunity to the recommended opportunity owner.

12. The system of claim 7, wherein the executable instructions further:
   rank each of the subset of the plurality of entity partners; and
   assign the opportunity to one or more of the subset of the plurality of entity partners according to the ranking.

13. A computer program product for implementing intelligent opportunity recommendation and management by a processor, the computer program product comprising a non-transitory computer-readable storage medium having computer-readable program code portions stored therein, the computer-readable program code portions comprising:
   an executable portion that receives a query from a user, via a graphical user interface (GUI), having input descriptive information of a selected opportunity comprising a sales transaction for a specific service or product between an entity and an alternative entity as indicated in the descriptive information received as input from the user, wherein a team of individuals represents the entity during the sales transaction, and wherein the team of individuals representing the entity during the sales transaction is not yet defined when the query is received;
   an executable portion that, responsive to receiving the query, receives opportunity data representative of the selected opportunity, wherein the opportunity data includes a plurality of opportunity attributes indicative of the descriptive information of the selected opportunity;
   an executable portion that receives historical opportunity data representative of prior opportunity data having prior opportunity attributes similar to the plurality of opportunity attributes of the selected opportunity, wherein the historical opportunity data is inclusive of prior opportunity performance data representative of a sales completion rate of transactions similar to the sales transaction by particular individuals associated with the entity;
   an executable portion that trains, in a first stage via a machine learning mechanism, an artificial neural network used to generate a channel selection model using the opportunity data and the historical opportunity data, wherein training the channel selection models includes extracting and analyzing the plurality of opportunity attributes and the prior opportunity attributes as features organized according to the prior opportunity performance data of a plurality of team candidates selected from the particular individuals for the team of individuals of the entity or a plurality of entity partners;
   an executable portion that applies the trained artificial neural network having generated the channel selection model to the selected opportunity in view of the plurality of opportunity attributes to identify a subset of the plurality of team candidates of the entity or a subset of the plurality of entity partners ranked by alignment with the selected opportunity and determine a recommended opportunity owner from the subset of the plurality of team candidates of the entity, the subset of the plurality of entity partners, or a combination thereof, wherein the subset of the plurality of entity partners is selected over the subset of the plurality of team candidates of the entity when the channel selection model indicates that the subset of the plurality of entity partners has a higher predicted sales completion rate for the selected opportunity than the subset of the plurality of team candidates, and wherein the channel selection model indicates whether the sales transaction for the specific service or product should be pursued by the subset of the plurality of team candidates of the entity or a subset of the plurality of entity partners through field sales or digital sales based on a predicted probability of securing the sales transaction through the field sales or the digital sales is above a predetermined threshold;
   an executable portion that displays the subset of the plurality of team candidates of the entity or the subset of the plurality of entity partners ranked by the alignment with the selected opportunity and the recommended opportunity owner as output to the query, via the GUI, according to the application of the trained artificial neural network having generated the channel selection model, wherein the displaying includes presenting a top K number of the subset of the plurality of team candidates of the entity or the subset of the plurality of entity partners and an explanation presented in natural language as to a reasoning of why each of the top K number were selected;
   an executable portion that receives feedback data via the GUI relating to the sales completion rate and the recommended opportunity owner of the selected opportunity from the subset of the plurality of team candidates of the entity, the subset of the plurality of the plurality of entity partners, or a combination thereof; and
   an executable portion that re-trains, in a second stage via the machine learning mechanism, the artificial neural network using the feedback data to iteratively update the channel selection model.

14. The computer program product of claim 13, further including an executable portion that:
   assigns the selected opportunity to the subset of the plurality of team candidates of the entity as the recommended opportunity owner; or
   reassigns the selected opportunity from the subset of the plurality of team candidates of the entity to the subset of the plurality of entity partners as the recommended opportunity owner upon expiration of a selected time period.

15. The computer program product of claim 13, wherein the historical opportunity data further includes prior collaborative opportunity data between the plurality of team candidates of the entity and the plurality of entity partners, social network data from the plurality of team candidates of the entity and the plurality of entity partners, or a combination thereof.

16. The computer program product of claim 13, further including an executable portion that selects the opportunity channel for the selected opportunity.

17. The computer program product of claim 13, further including an executable portion that:

builds the recommended opportunity owner from the subset of the plurality of team candidates of the entity, the subset of the plurality of entity partners, or a combination thereof;

assigns the opportunity to the recommended opportunity owner;

ranks each of the subset of the plurality of entity partners; or assigns the opportunity to one or more of the subset of the plurality of entity partners according to the ranking.

* * * * *